United States Patent [19]
Tojo et al.

[11] Patent Number: 6,114,449
[45] Date of Patent: Sep. 5, 2000

[54] CURABLE RUBBER COMPOSITION

[75] Inventors: Tetsuo Tojo; Takashi Hakuta; Mikio Hosoya, all of Ichihara, Japan

[73] Assignee: Mitsui Chemicals, Inc., Tokyo, Japan

[21] Appl. No.: 09/134,872

[22] Filed: Aug. 17, 1998

[30] Foreign Application Priority Data

Aug. 13, 1997 [JP] Japan ..................... 9-218810

[51] Int. Cl.⁷ ..................... C08F 8/00
[52] U.S. Cl. ..................... 525/105; 525/479
[58] Field of Search ..................... 525/105, 479

[56] References Cited

U.S. PATENT DOCUMENTS

| | | | |
|---|---|---|---|
| 4,365,042 | 12/1982 | Cooper et al. | 525/68 |
| 5,210,121 | 5/1993 | Hinterwaldner | 525/241 |

FOREIGN PATENT DOCUMENTS

0765908A1  4/1987  European Pat. Off. .

*Primary Examiner*—Melvyn I. Marquis
*Attorney, Agent, or Firm*—Birch, Stewart, Kolasch & Birch, LLP

[57] ABSTRACT

A curable rubber composition comprises of a silicone rubber (A) and an ethylene-α-olefin-polyene amorphous copolymer (B) containing as the polyene component a norbornene compound having at least one kind of vinyl terminal group represented by 5-vinyl-2-norbornene or 5-methylene-2-norbornene. The rubber composition is speedily cured, if said components (A) and (B) are mixed by the A/B mixing ratio of 98/2–2/98 (% by weight) and kneaded in the presence of an organic peroxide. A vulcanizate rubber excelling in mechanical strength, water resistance and thermal aging resistance can be manufactured from said composition, since its crosslink density can be enhanced without impairing processing properties. Additionally, said composition entails reduced mold fouling phenomenon in the molding operation. Vulcanizate rubber thereby obtained can be advantageously used as industrial parts and electric parts.

9 Claims, No Drawings

CURABLE RUBBER COMPOSITION

BACKGROUND OF THE INVENTION

1. Field of the Invention

The present invention relates to a curable rubber composition. More particularly, the present invention relates to a curable rubber composition comprising a silicone rubber and an ethylene-α-olefin-polyene amorphous copolymer having specified polyene components. Furthermore particularly, the present invention relates to a curable rubber composition having superior strength properties and water resistance to those of the silicone rubber and reduced mold fouling phenomenon and thermal aging resistance as compared with the ethylene-α-olefin-polyene amorphous copolymer.

2. Description of the Background

There prevails a demand for improved strength and water resistance of the silicone rubber, which has served various industrial applications such as packing, gaskets, diaphragms, rollers and belting by dint of its good thermal aging resistance. An attempt has been made to develop an improved recipe of the silicone rubber by way of adding fine divided silica with the result that its processing properties tend to be thereby impaired, although its strengths were improved.

The ethylene-α-olefin-polyene amorphous copolymer, on the other hand, serves such uses as glass run channels, weather strip sponge, radiator hose, various boots and plug caps for the automotive application by dint of its merits including high strength and water resistance and excellent dielectric strength. Nonetheless, there prevails a demand for further improvement of its thermal aging resistance as well as solution of problems associated with mold fouling.

SUMMARY OF THE INVENTION

With a view to resolving the above-mentioned technical problems, it is an object of the present invention to provide a curable rubber composition having superior strength and water resistance to those of the silicone rubber.

Another object of the present invention is to provide a curable rubber composition which has superior thermal aging resistance and reduced mold fouling to that of the ethylene-α-olefin-polyene amorphous copolymer.

Other and further objects, features and advantages of the present invention will appear more fully in the following description.

According to the present invention, the curable rubber composition comprises of 2–98% by weight of the silicone rubber (A) and 98–2% by weight of the ethylene-α-olefin polyene amorphous copolymer (B) and said polyene is a norbornene compound containing at least one kind of vinyl terminal group which is represented by the following general formula [I] or [II].

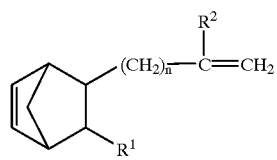

[I]

wherein n is an integer of 0–10
$R^1$ is a hydrogen atom or an alkyl group having 1 to 10 carbon atoms and $R^2$ is a hydrogen atom or an alkyl group having 1 to 5 carbon atoms,

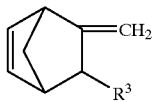

[II]

wherein $R^3$ is a hydrogen atom or an alkyl group having 1 to 10 carbon atoms.

The preferable kind of the silicone rubber to be used is a vinyl group-containing silicone, and this rubber composition is readily curable with an organic peroxide.

DETAILED DESCRIPTION OF THE PREFERRED EMBODIMENTS

The present invention is explained in detail as follows.

Silicone Rubber (A)

The silicone rubber (A) used for the present invention is a rubber having organosiloxane units as the recurring units in polymer main chains, wherein the organosiloxane unit is represented by the following general formula [IV].

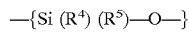

$$-\{Si(R^4)(R^5)-O-\} \qquad [IV]$$

where $R^4$ and $R^5$ are each monovalent organo group, or particularly an alkyl group such as methyl group, ethyl group, etc.; an aryl group such as phenyl group, etc.; an alkenyl group such as vinyl group, etc.; a cyanoalkyl group such as γ-cyanopropyl group, etc.; or a fluoroalkyl group such as trifluropropyl group, etc.

The rubber having said organosiloxane unit which is well-known and is conventionally referred to as, for example, dimethyl silicone rubber, methyl phenyl silicone rubber, methyl vinyl silicone rubber, fluorinated alkyl methyl silicone rubber, cyanoalkyl silicone rubber, etc.

The conventional type among those kinds of the silicone rubber is dimethyl silicone rubber. On the other hand, methyl phenyl silicone rubber is known to have improved low-temperature performances compared with dimethyl silicone rubber and good thermal resistance and radiation resistance. Methyl vinyl silicone rubber has double bonds introduced into polymer chain with intent to increase the rate of vulcanization, and has as its characterizing feature a low level of post-vulcanization compression set. Fluorinated alkyl methyl silicone rubber exhibits excellent resistance to solvent swell. Cyanoalkyl silicone rubber has improved resistance to solvent swell and low-temperature flexibility.

As explained in the foregoing, various kinds of the silicone rubber have characteristic properties of their own, and are selectively used for suitable uses, respectively. In the present invention, it is preferable that $R^4$ and/or $R^5$ in said organosiloxane unit are or is a vinyl group, and the silicone rubber having the content of vinyl group as the cross-link site is 0.02–2.0 mole %, or preferably 0.05–1.5 mole % is advantageously used. The mold fouling effect is improved and the thermal aging resistance is enhanced so long as the vinyl group content remains within said range. Additionally, it is desirable that the silicone rubber prior to crosslinking (i.e., raw rubber) has a weight average molecular weight of $100 \times 10^3 - 2 \times 10^6$ as calculated by a gel permeation chromatography method, using chloroform as the solvent and commercially available polystyrene standards and performed at a temperature of 25° C. If said kind of silicone rubber is used, the curable rubber composition having excellent mechanical strength, reduced mold fouling, and thermal aging resistance can be obtained.

The silicone rubber is produced by a conventional method. For instance, the silicone rubber is manufactured by producing cyclic diorganosiloxane oligomers represented by the following general formula [VI], or particularly tetramers, by hydrolysis of organochlorosilane represented by the following general formula [V], and then subjecting said cyclic diorganosiloxane oligomers to the ring-opening polymerization.

$(R^4)(R^5)SiCl_2$     [V]

$\{(R^4)(R^5)Si-O-\}n$     [VI]

wherein $R^4$ and R5 are each same as the above-mentioned ones, and n is a value of 3–25.

For the ring-opening polymerization a strong alkali or strong acid is employed. More particularly, sodium hydroxide, quaternary ammonium such as tetramethyl ammonium hydroxide, etc. and quaternary phosphate such as tetra-n-butylphosphonium hydroxide, etc. may be cited as examples of the catalyst. The reaction is normally carried out in a bulk state. Adding hexamethyldisiloxane or sodium hydroxide to the reactant terminates the reaction.

The means to introduce organo groups other than methyl group into the side chain $R^4$ and/or $R^5$ of the organosiloxane unit may be such that cyclic diorganosiloxane oligomers are produced from organochlorosilane having a desirable organo group and then subjecting the cyclic diorganosiloxane oligomers to the ring-opening polymerization. There may be adopted a method of partially modifying silicone rubber by adding alkoxysilane having a corresponding organo group to the reaction system while the ring-opening polymerization is in progress.

Ethylene-α-olefin-polyene Amorphous Copolymer (B)

The ethylene-α-olefin-polyene amorphous copolymer to be used in the present invention is an amorphous copolymer comprising as its constituent units ethylene, α-olefin and a norbornene compound containing at least one kind of said vinyl end group.

An α-olefin to be selected is the one having 3 to 20 carbon atoms. Specifically, there may be cited as examples of such α-olefin propylene, 1-butene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene, 12-ethyl-1-tetradecene. These α-olefins are used either individually or in a combination of two or more kinds. Among them α-olefins having 3 to 10 carbon atoms, particularly, propylene, 1-butene, 1-hexene and 1-octene are suitable.

Ethylene and α-olefin are contained in terms of the ethylene to α-olefin mole ratio by 40/60–95/5, or preferably 50/50–90/10, or more preferably 55/45–85/15, or particularly preferably 60/40–80/20. So long as the ethylene-to-α-olefin composition ratio remains in either said range, processing properties, rubber behavior and weather resistance can be maintained at satisfactory levels.

The polyene is a norbornene compound having a double bond at least at one ends as represented by the following general formula [I] or [II].

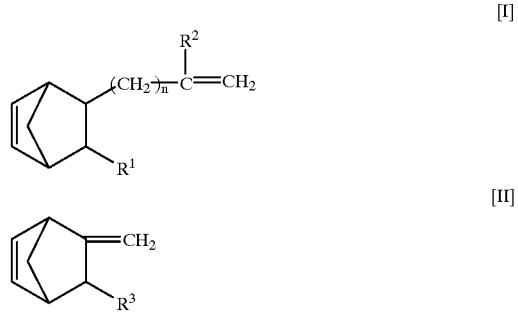

wherein n is an integer of 0 to 10, and $R^1$, $R_2$ and $R^3$ are as explained as follows.

$R^1$ in the above-cited general formula [I] and $R^3$ in the above-cited general formula [II] is each a hydrogen atom or an alkyl group having 1 to 10 carbon atoms. There may be cited as examples of these alkyl groups methyl group, ethyl group, propyl group, iso-propyl group, n-butyl group, iso-butyl group, sec-butyl group, t-butyl group, n-pentyl group, iso-pentyl group, t-pentyl group, neopentyl group, hexyl group, octyl group, nonyl group and decyl group.

$R^2$ in the above-cited general formula [I] is a hydrogen atom or an alkyl group having 1 to 5 carbon atoms. There may be cited as examples of this alkyl group methyl group, ethyl group, propyl group, iso-propyl group, n-butyl group, iso-butyl group, sec-butyl group, t-butyl group, n-pentyl group, iso-pentyl group, t-pentyl group, and neopentyl group.

There may be cited as examples of the norbornene compound represented by the above-cited general formula [I] or [II] 5-methylene-2-norbornene, 5-vinyl-2-norbornene, 5-(2-propenyl)-2-norbornene, 5-(3-butenyl)-2-norbornene, 5-(1-methyl-2-propenyl)-2-norbornene, 5-(4pentenyl)-2-norbornene, 5-(1-methyl-3-butenyl)-2-norbornene, 5-(5-hexenyl)-2-norbornene, 5-(1-methyl-4-pentenyl)-2-norbornene, 5-(2,3-dimethyl-3-butenyl)-2-norbornene, 5-(2-ethyl-3-butenyl)-2-norbornene, 5-(6-heptenyl)-2-norbornene, 5-(3-methyl-5-hexenyl)-2-norbornene, 5-(3,4dimethyl-4pentenyl)-2-norbornene, 5-(3-ethyl-4pentenyl)-2-norbornene, 5-(7-octenyl)-2-norbornene, 5-(2-methyl-6-heptenyl)-2-norbornene, 5-(1,2-dimethyl-5-hexenyl)-2-norbornene, 5-(5-ethyl-5-hexenyl)-2-norbornene, 5-(1,2,3-trimethyl-4-pentenyl)-2-norbornene.

Among those examples cited above, 5-vinyl-2-norbornene, 5-methylene-2-norbornene, 5-(2-propenyl)-2-norbornene, 5-(3-butenyl)-2-norbornene, 5-(4pentenyl)-2-norbornene, 5-(5-hexenyl)-2-norbornene, 5-(6heptenyl)-2-norbornene, and 5-(7-octenyl)-2-norbornene are preferably used.

Besides the above-mentoned norbornene compounds, non-conjugated polyenes exemplified below may be copolyerized into the copolymer (B) to the extent that the intended properties are kept from being impaired.

There may be cited as specific examples of non-conjugated polyene linear non-conjugated dienes such as 1,4-hexadiene, 3-methyl-1,4-hexadiene, 4-methyl-1,4-hexadiene, 5-methyl-1,4-hexadiene, 4,5-dimethyl-1,4-hexadiene, 7-methyl-1,6-octadiene, etc.; and cyclic non-conjugated dienes such as methyltetrahydroindene, 5-ethylidene-2-norbornene, 5-methylene-2-norborne, 5-isopropylidene-2-norbornene, 5-vinylidene-2-norbornene, 6-chloromethyl-5-isopropenyl-2-norbornene, dicyclopentadiene, etc.; and, additionally, trienes such as 2,3-diisopropylidene-5-norbornene, 2-ethylidene-3- isopropylidene-5-norbornene, 2-propenyl-2,2-norbornadiene, etc.

Of those ethylene-α-olefin-polyene amorphous copolymer, ethylene-propylene-5-methylene-2-norbornene random copolymer or ethylene-propylene-5-vinyl-2-norbornene random copolymer is preferable for the purpose of obtaining a curable rubber composition.

Said polyene components may be used either individually or in a combination of two or more kinds. The polyene component content of the copolymer (B) can be indirectly estimated by determining the iodine value of the copolymer on the basis of its unsaturated bond content indicated by the iodine value. The iodine value of the copolymer used in the present invention is 0.5–50 (g/100 g), or preferably 0.8–40 (g/100 g), or more preferably 1–30 (g/100 g), or particularly preferably 1.5–20 (g/100 g). So far as the iodine value remains in the said ranges, the polyene content is at a desirable level, since in addition to sufficient mechanical strengths required of rubber, it gives elongation percentage and permanent deformation falling in adequate ranges and a great resistance to environmental degradation.

The molecular weight of the copolymer (B) as indicated by the intrinsic viscosity [η] determined in a decalin solution maintained at 135° C. is in a range of 0.5–10, or preferably 0.7–2.0 (dl/g). The copolymer (B) with its intrinsic viscosity [η] falling in said ranges exhibits excellent processing properties along with high mechanical strengths.

While the ratio of the weight average molecular weight (Mw) to the number average molecular weight (Mn) as determined by gel permeation chromatography (GPC) (Mw/Mn) is usually utilized as an indicator of the molecular weight distribution, the Mw/Mn value of the copolymer (B) employed in the present invention is 3–50, or preferably 3.3–40, or more preferably 3.5–30. The copolymer with its molecular weight distribution indicator falling in said ranges exhibits an excellent balance between physical properties and processability inherent to rubber.

This ethylene-α-olefin-polyene amorphous copolymer (B) is crosslinked with an organic peroxide with the result that a high crosslink density is achieved. The degree of crosslink density is judged in light of the effective network chain density (v). When press cure is carried out under conditions of 170° C. and 10 minutes with 0.01 mole of dicumyl peroxide added to 100 g of copolymer, the effective network chain density (v) is $1.5 \times 10^{20}$ to $100 \times 10^{20}$ pcs./cm$^3$, or preferably $1.8 \times 10^{20}$ to $100 \times 10^{20}$ pcs./cm$^3$, or more preferably $2.0 \times 10^{20}$ to $100 \times 10^{20}$ pcs./cm$^3$.

When the ethylene-α-olefin-polyene amorphous copolymer (B) of the present invention produced with such as 5-methylene-2-norbornene (MND) or 5-vinyl-2-norbornene (VND), which is a cyclic non-conjugated polyene, is crosslinked with a peroxide, rubber having an effective network chain density (v) of $1.5 \times 10^{20}$ pcs./cm$^3$ can be produced, and this rubber gives a low level of permanent set and excellent thermal aging resistance. On the other hand, in the case of the ethylene-α-olefin-polyene amorphous copolymer containing 5-ethylidene-2-norbornene (ENB) or dicyclopentadiene (DCPD) which has been conventionally used, it is difficult to achieve a post-vulcanization network chain density (v) falling within said range, even if the iodine value of the copolymer is in said range. This copolymer has only a high level of permanent set and does not give sufficient thermal aging resistance. Said situations signify that even if the iodine value is the same, that is to say, the unsaturated bond content of the copolymer is the same, a copolymer containing a norbornene compound shown by said general formula [I] or [II] as the polyene component affords a faster rate of crosslinking with a peroxide than a copolymer containing ENB or DCPD.

A conceivable cause of said outcome is as follows. Namely, if non-conjugated polyene is copolymerized with ethylene and α-olefin, one ethylenic unsaturated bond is expended in the copolymerization reaction and the other ethylenic unsaturated bond remains in the copolymer chain. If the non-conjugated polyene is of a cyclic structure, the residual ethylenic unsaturated bond exists in two different modes, i.e., the bond positioned in the ring in one case and the bond positioned out of the ring in the other case. The ethylenic unsaturated bond positioned outside of the ring is considered to have a greater freedom and higher reactivity than the ethylenic unsaturated bond positioned inside the ring. In the case where a norbornene compound having the chemical structure shown by the above-mentioned general formula [I] or [II] is used, it is inferred that the ethylenic unsaturated bond positioned outside of the ring remains in a high proportion to be expended in the crosslinking reaction with the result that the obtained copolymer is endowed with said excellent properties of crosslinked (cured) rubber.

In the case of the ethylene-α-olefin-polyene amorphous copolymer (B) of the present invention, there exists a close relationship between the crosslink density and the melt flow properties. That is to say, it is desirable that the relationship between the logarithm of the ratio of [the shear rate ($\gamma_2$) at shear stress of $2.4 \times 10^6$ (dyn/cm$^2$) as determined from a melt flow curve plotted for a temperature of 100° C.] to [the shear rate ($\gamma_1$) at shear stress of $0.4 \times 10^6$ (dyn/cm$^2$) as determined from a melt flow curve plotted for a temperature of 100°C.], namely, ($\gamma_2/\gamma_1$), versus said effective network chain density (v) satisfies the following equation [III].

$$0.04 \times 10^{-19} \leq \log(\gamma_2/\gamma_1)/v \leq 0.20 \times 10^{-19} \qquad [III]$$

Said equation is preferably $$0.042 \times 10^{-19} \leq \log(\gamma_2/\gamma_1)/v \leq 0.19 \times 10^{-19},$$

or more preferably $$0.050 \times 10^{-19} \leq \log(\gamma_2/\gamma_1)/v \leq 0.18 \times 10^{-19}.$$

The above-mentioned equation [III] shows a balance between the dependence of the shear rate upon the shear stress during the melt flow period and the crosslinkability of rubber. According to a melt flow curve prepared by plotting the relationship between the shear stress (σ) of the polymer and the shear rate (γ), the extent of an increase in the shear rate (γ) on the basis of the extent of an increase in the shear stress (σ) is remarkably immense, with the melt viscosity (η) represented by the equation of [η=σ/γ] wherein "σ" is the shear stress and "γ" is the shear rate of the polymer. The logarithm of the shear rate ratio ($\gamma_2/\gamma_1$) of the polymer in the equation [III] turns out to be a larger value with an increase in the dependence of the shear rate upon the shear stress in the melt flow period of the copolymer, and it turns out to be a smaller value with a decrease in the dependence of the shear rate upon the shear stress. Hence, for the purpose of achieving excellent thermal aging resistance, while maintaining processing properties and mechanical properties of the copolymer maintained at high levels, it is desirable that the ratio of the logarithm of ($\gamma_2/\gamma_1$) to the effective network chain density (v) is in the range of the equation [III]. That is to say, if this value is below $0.04 \times 10^{-19}$, the processilbility tends to decline. By contrast, if it is above $0.20 \times 10^{-19}$, strengths tend to be lowered, and/or permanent set tends to increase, and/or thermal aging resistance tends to decrease. All in all, it is undesirable to use such material as the composition of the present invention.

A Process of Manufacturing Copolymer (B)

According to the present invention, the ethylene-α-olefin-polyene amorphous copolymer is obtained by random copolymerizing ethylene, α-olefin and polyene having the norbornene skeleton under the copolymerization conditions explained as follows.

The copolymerization reaction is carried out normally by a continuous polymerization process. The raw material monomers, catalyst components and hydrocarbon medium (media) are continuously fed into the polymerization reactor system, and the polymerization reaction mixture is continuously discharged from the polymerization reactor system. The composition of monomers is controlled in a range of 40/60–95/5 (mole ratio) as represented by the ratio of ethylene/α-olefin in the copolymer. The ratio of non-conjugated polyene to ethylene is controlled in a range of 0.01–0.2 (mole ratio) by the feed amount. The copolymerization is carried out under conditions of the polymerization temperature of 30–60° C., or particularly 30–50° C., and the polymerization pressure of 4–12 kgf/cm$^2$, or particularly 5–8 kgf/cm$^2$. Depending on prevailing need, inert gas(es) such as nitrogen, argon, etc. may be kept in presence. The average residence time, which varies with the kind of the raw materials, the concentrations of the catalyst components and the temperature, is controlled normally in a range of 5 mn. to 5 hrs., or preferably in a range of 10 min. to 3 hrs. Moreover, in order to adjust the molecular weight of the copolymer, a molecular weight controlling agent such as hydrogen is sometimes caused to be present, if the circumstance so dictates.

The main components of the polymerization catalyst are a vanadium compound soluble in a hydrocarbon medium in the polymerization reactor system and an organoaluminum compound. Depending on prevailing need, a third component such as an electron donor substance may be caused to coexist.

The soluble vanadium compound component of the catalyst is a compound represented by the following general formula.

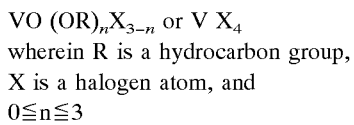

wherein R is a hydrocarbon group,
X is a halogen atom, and
$0 \leq n \leq 3$

In more detail, there can be cited as the typical example of said component any vanadium compound represented by the following general formula, or its electron donor adduct.

VO (OR) a Xb or V (OR) c Xd wherein $0 \leq a \leq 3$, $0 \leq b \leq 3$, $2 \leq a+b \leq 3$, $0 \leq c \leq 4$, $0 \leq d \leq 4$, $3 \leq c+d \leq 4$.

More specifically, there can be cited as examples VOCl$_3$, VO(OC$_2$H$_5$)$_2$Cl$_2$, VO(OC$_2$H$_5$)$_2$Cl, VO(O—iso—C$_3$H$_7$)Cl$_2$, VO(O—n—C$_4$H$_9$)Cl$_2$, VO(OC$_2$H$_5$)$_3$, VOBr$_3$, VCl$_4$, VO(O—n—C$_4$H$_9$)$_3$.

What can be utilized as the organoaluminum compound component of the catalyst is a compound represented by the following general formula.

wherein R is a hydrocarbon group,
X is a halogen atom, and
$0 < m \leq 3$.

As specific examples of the aluminum compound represented by the above general formula, there can be cited the following compounds.

a) Trialkyl aluminum such as triethyl aluminum, and triisobutyl aluminum;
b) Dialkyl aluminum halide such as diethyl aluminum chloride, diisobutyl aluminum chloride, etc.
c) Alkyl aluminum sesquihalide such as ethyl aluminum sesquichloride, isobutyl aluminum sesquichloride, n-hexyl aluminum sesquichloride, etc.
d) Alkyl aluminum dihalide such as ethyl aluminum dichloride, ethyl aluminum dibromide, isobutyl aluminum dibromide, etc.

Among the compounds identified above, it is desirable to use a halogen-containing organoaluminum compound having an average composition wherein "m" in the above-cited general formula satisfies the relationship of $1 \leq m \leq 2$.

An organoaluminum compound having a chemical structure wherein a part of R shown in the above general formula is substituted by hydrogen or an alkoxyl group may be used either in combination with the organoaluminum compound represented by the above general formula or in place of such organoaluminum compound.

Of all said organoaluminum compounds, it is desirable to use as mixture of (C$_2$H$_5$)$_2$Al Cl and (C$_2$H$_5$)$_{1.5}$Al Cl$_{1.5}$ prepared by admixing the two at a mole ratio of 1:5–10:1, more preferably 1:2–8:1 from the viewpoint of reducing the amounts of insoluble-to-xylene substances in the produced copolymer.

The copolymerization reaction can be carried out in a hydrocarbon medium. There can be cited as examples of hydrocarbon medium (a) aliphatic hydrocarbons such as hexane, heptane, octane and kerosene, (b) alicyclic hydrocarbons such as cyclohexane and methylcyclohexane, (c) aromatic hydrocarbons such as benzene, toluene and xylene, and (d) polymerizable unsaturated hydrocarbons such as propylene. The hydrocarbon medium may be a mixture of two or more kinds of the above-exemplified hydrocarbons.

In practicing polymerization procedures by a continuous process, the soluble vanadium compound concentration in the copolymerization reactor system is controlled normally in a range of 0.01–5 (gram-atom/liter, or preferably 0.05–3 (gram-atom/liter). The concentration of the soluble vanadium compound fed into the polymerization reactor system is controlled in a range of 1–10 times in terms of the ratio to the concentration of the soluble vanadium compound in the polymerization reactor system, or preferably 1–7 times, or more preferably 1–5 times, most desirably 1–3 times.

The ratio of the aluminum atom to the vanadium atom (Al/V) in the polymerization reactor system is in a range of 2 or more, or preferably in the range of 2 to 50, or more preferably in a range of 3 to 20. The soluble vanadium compound and the organoaluminum compound are diluted with normally said hydrocarbon medium or media, respectively, and fed into the polymerization reactor system. It is desirable that the soluble vanadium compound be diluted to a concentration in said range. The method adopted for the present invention is to adjust the concentration of the organoaluminum compound to an optional level, for instance, below 50 times of the concentration in the polymerization reactor system.

The solution of produced copolymer as it is discharged from the polymerization reactor system, which functions as the hydrocarbon medium solution of the copolymer, has its copolymer concentration within a range of normally 2.0–20.0% by weight, or preferably within a range of 2.0–10.0% by weight. The copolymer to be used in the present invention is obtained by removing the hydrocarbon medium from the polymer solution by a conventional method.

Organic Peroxide

By adding a free radical initiator, especially an organic peroxide, to the curable rubber composition of the present invention and heating the mixture thereby obtained, the crosslinking reaction progresses to the extent that vulcanizate rubber is manufactured. There is no particular limitation to the usable organic peroxide. There can be cited the following compounds as specific examples of desirable organic peroxide.

a) Dialkyl peroxides such as dicumyl peroxide, di-t-butyl peroxide, di-t-butyl peroxy-3,3,5-trimethylchlorohexane, t-butylcumyl peroxide, di-t-amyl peroxide, t-butyl hydroperoxide, 2,5-dimethyl-2,5di(t-butyl peroxy)hexyne-3,2,5-dimethyl-2,5-di(benzoyl peroxy)hexane, 2,5-dimethyl-2,5-mono(t-butyl peroxy)hexane, 2,5-dimethyl-2,5-mono(t-butyl peroxy)hexane, α,α'-bis(t-butyl peroxy-m-isopropyl)benzene, etc.

b) Peroxy esters such as t-butyl peroxy acetate, t-butyl peroxyisobutylate, t-butyl peroxy pivalate, t-butyl peroxy maleate, t-butyl peroxy neodecanoate, t-butyl peroxy benzoate, di-t-butyl peroxy phthalate, 1,1-bis-t-butyl peroxy-3,3,5-trimethyl cyclohexane, etc.

c) Ketone peroxides such as dicyclohexanone peroxide, etc.

Among the above-mentioned organic peroxides, preferable ones are those organic peroxides falling in a temperature range of 130–200° C. in respect of the temperature affording a half-life of 1 min, since they are suitable for practical vulcanizing conditions. In particular, the following organic peroxides are preferably used.

dicumyl peroxide, di-t-butyl peroxide, di-t-butyl peroxy-,3,5-trimethyl cyclohexane, t-butyl cumyl peroxide, di-t-amyl peroxide, t-butyl hydro-peroxide, 2,5-dimethyl-2,5-di(t-butyl peroxy)hexyn-3, 2,5-dimethyl-2,5-mono(t-butyl peroxy) hexane, 1,1-bis-t-butyl peroxy-3,3,5-tri-methyl cyclohexane, etc.

Rubber Composition

The curable rubber composition of the present invention comprises the silicone rubber (A) and the ethylene-α-olefin-polyene amorphous copolymer (B). It is desirable that the mixing ratio of said components is in a range of 98/2–2/98 in terms of the A/B ratio in % by weight, or preferably 97/3–3/97, or more preferably 95/5–5/95. The silicone rubber (A) and the ethylene-α-olefin-polyene amorphous copolymer (B) are mixed within a wide range as explained above, and the curable rubber composition having excellent properties inherent to rubber can be obtained. So far as the mixing ratio remains in said ranges, rubber which has improved mechanical strength, water resistance, mold fouling property, and thermal aging resistance as well as excellent cost performance can be obtained with properties inherent to the silicone rubber and the ethylene-α-olefin-polyene amorphous copolymer preserved intact.

The dosage of an organic peroxide used in the vulcanization stage is $1 \times 10^{-3} - 5 \times 10^{-2}$ mole, or preferably $3 \times 10^{-3} - 3 \times 10^{-2}$ mole, on the basis of 100 g of the silicone rubber (A) and the ethylene-α-olefin-polyene amorphous copolymer (B) combined, since it gives the intended crosslink density at a modest rate of vulcanization.

As compounding ingredients, those compounding ingredients which are employed in processing the conventional rubber, for example, reinforcing fillers, fillers, softeners, vulcanizaton auxiliary, process aids, pigments, aging inhibitor and other materials are added optionally to the curable rubber composition of the present invention and vulcanizate is thus manufactured.

As the reinforcing filler, there are optionally used various kinds of carbon black, such as SRF, GPF, FEF, MAF, ISAF, SAF, FT, MT, etc., silicate powder, etc. As the filler, such materials as light calcium carbonate, heavy calcium carbonate, talc and clay are used. Dosages of said reinforcing fillers and fillers are adjusted liberally in accordance wth the intended end product, so long as they are normally not more than 200 parts by weight on the basis of 100 parts by weight of silicone rubber (A) and ethylene-α-olefin-polyene amorphous copolymer (B) combined, or preferably not more than 150 parts by weight.

As the softener, those softeners which are used with the conventional rubber are used. There can be cited as examples of the softener (a) petroleum-derived materials such as process oil, lubricating oil, paraffin, liquid paraffin, petroleum asphalt, vaseline, etc.; (b) coal tars, such as coal tar, coal tar pitch, etc.; (c) fatty oils, such as linseed oil, rapeseed oil, soybean oil, palm oil, etc.; (d) waxes, such as tall oil, beeswax, carnauba wax lanolin, etc.; (e) fatty acids and metallic salts thereof, such as ricinolic acid, palmitic acid, stearic acid, barium stearate, calcium stearate, etc. and metallic salts thereof, (f) naphthenic acid and metallic soap thereof, (g) pine oil, rosin and derivative thereof, (h) terpene resin; (i) petroleum resin; (j) cumarone-indene resin; (k) atacfic polypropylene; (l) ester plasticizers, such as dioctyl phthalate, dioctyl phthalate, dioctyl adipate, dioctyl sebacate, etc.; (m) carbonic ester plasticizers, such as diisodecyl carbonate; (n) microcrystalline waxes; (o) factices; (p) liquid polybutadiene; (q) modified liquid polybutadiene; (r) liquid Thiokol; (s) synthetic hydrocarbon lubricating oil, etc. The dosages of said softeners are not more than 100parts by weight on the basis of 100 parts by weight of the silicone rubber (A) and the ethylene-α-olefin-polyene amorphous copolymer (B) combined, or preferably not more than 70 parts by weight.

It is desirable to cause vulcanization auxiliary in case organic peroxide is used. There can be cited as examples of the vulcanization auxiliary (a) sulfur; (b) quinone dioxime (CDO) type, such as p-quinonedioxime; (c) acrylic type, such as ethyleneglycol dimethacrylate, trimethylol propane trimethacrylate, etc.; (d) allyl type, such as diallyl phthalate, triallyl isocyanurate, etc.; (e) maleimide type; (f) divinyl benzene, etc. It is desirable that said vulcanization auxiliaries are used by 0.5–2 mole on the basis of 1 mole of the organic peroxide to be used, or preferably by an equivalent mole ratio.

As process aids, there can be cited as examples ricinolic acid; stearic acid; palmitic acid; lauric acid; barium stearate; calcium stearate; zinc stearate; and esters of said acids; higher fatty acid, and salts and esters thereof. The dosages of said process aids are not more than 10 parts by weight on the basis of 100 parts by weight of silicone rubber (A) and ethylene-α-olefin-polyene amorphous copolymer (B) combined, or preferably by about 1–5 parts by weight.

Depending on the kind of the product, a pigment is used. Examples of pigments used are an inorganic pigment like titanium white or an organic pigment like naphthol green B. While the dosage varies with the type of product, a pigment is added by a maximum of 20 parts by weight on the basis of 100 parts by weight of the silicone rubber (A) and the ethylene-α-olefin-polyene amorphous copolymer (B) combined, or preferably by a maximum of 10 parts by weight.

As activators, such conventional compounding ingredients as zinc white, polyethylene glycol, silane coupling agent, and organic titanate are optionally used.

Mixing of said compounding ingredients with unvulcanized rubber is performed by feeding into a mixer such as Banbury-type mixer or a kneader the silicone rubber (A), the ethylene-α-olefin non-conjugated polyene copolymer (B), fillers, softeners, and other compounding ingredients and kneading all the ingredients for 3–10 min. at a temperature of 80–150° C. Thereupon, an organic peroxide (C) is added and mixed, using rolls like open rolls and all the ingredients are kneaded for 5–30 min. at a temperature of 40–80° C. After the kneading is completed, the compound is taken out as compounded rubber in a ribbon or sheet form.

The compounded rubber article thus prepared is preformed into an intended shape, using an extruder, injection molding machine, calenders, or compression press. A vulcanizate is obtained by heating the formed rubber for 1–30 minutes at a temperature of 130–230° C., either successively in the molding machine, or after being moved into a vulcanization vessel, oven or the like. The vulcanization step may be gone through, using a mold or without using a mold.

Effect of the Invention

According to the present invention, it has been rendered practicable by combining the silicone rubber (A) with the ethylene-α-olefin-polyene amorphous copolymer (B) to obtain the rubber composition which gives an adequate vulcanization density at a fast rate of vulcanization. Consequently, it has been rendered practicable to provide vulcanizate articles having high mechanical strength, excellent processing properties and rubber elasticity.

What the present invention has successfully accomplished with this rubber are improvements to overcome insufficient strengths and water resistance of the silicone rubber and improvements to overcome insufficient thermal aging resistance and mold fouling of the ethylene-α-olefin-polyene amorphous copolymer. The reasons why those effects of improvements have been achieved are not explicitly known. However, it is considered to be one of the reasons that the ethylene-α-olefin-polyene amorphous copolymer (B), by dint of the presence of particular polyene components in itself, enhances the radical reactivity, and consequently, the co-crosslinkability between the silicone rubber and the ethylene-α-olefin-polyene amorphous copolymer is enhanced.

All in all, the curable rubber composition of the present invention, by virtue of its excellent rubber properties encompassing strengths, water resistance, thermal aging resistance, reduced mold fouling, can be utilized over extensive fields of application as industrial parts, electrical parts, construction and building parts.

In the industrial parts area, the curable rubber composition of the present invention can be used for belting, rubber rolls, hose, boots, gaskets, packing, etc. As electrical parts, it can be used as caps such as plug caps, distributor caps, capacitor caps, etc., insulation jackets of marine wire and cable, ignition cable, etc. For the construction and building applications, it can be used as gaskets, highway joint seal, etc.

EXAMPLES

The present invention will be understood more readily with reference to the following examples; however, these examples are intended to illustrate the invention and are not to be construed to limit the scope of the present invention.

(The method of determining physical properties)

1) The composition of copolymer: $^{13}$NMR was used.
2) The iodine value: A titration method
3) The intrinsic viscosity [η]: Measurement was made in decalin at a temperature of 135° C.
4) The molecular weight distribution: A weight average molecular weight (Mw) and a number average molecular weight (Mn) were determined by GPC and the ratio of Mw to Mn (Mw/Mn) was employed to indicate the molecular weight distribution. For GPC, columns GMH-HT and GMH-HTL manufactured by TOSOH CORPORATION, Japan, were used and ortho-dichlorobenzene was used as the solvent.
5) $[\gamma_2/\gamma_1]$: A melt flow curve at a temperature of 100° C. was plotted, and the ratio of the shear rate ($\gamma_2$) at the shear stress of $0.4 \times 10^6$ (dyn/cm$^2$) as determined by said curve to the shear rate ($\gamma_1$) at the shear stress of $2.4 \times 10^6$ (dyn/cm$^2$) was calculated
6) The effective network chain density (ν): In compliance with JIS K6258 (1993), specimens were immersed in toluene for 72 hrs. at a temperature of 37° C. Thereupon, the effective network chain density was calculated, using Flory-Rehner equation. The Flory-Rehner equation is as follows:

$$\nu(\text{pcs./cm}^3) = [v_R + \ln(1-v_R) + \mu v_R^2]/[-V_0(v_R^{1/3} - v_R/2)]$$

Wherein
ν(pcs./cm$^3$): The effective network chain density. That is to say, the number of effective network chains in 1 cm$^3$ of pure rubber $v_R$: The ratio of the volume of pure rubber to the volume of the swollen pure rubber in the swollen vulcanizate (i.e. the volume of pure rubber+the volume of the absorbed solvent)

$\mu$: The interaction constant between rubber and the solvent (0.49)

$V_0$: The molar volume of the solvent

Preparation of the Specimen 0.01 mole of dicumyl peroxide was added to 100 g of the copolymer and the batch was kneaded with a temperature of 50° C. The test mixing mill is a standard test mixing mill specified by SRIS 2603 (Standard Rubber Mixing Mill) having rolls of 150 mm diameter and 330 mm width (6×13 Type). The mill roll temperature of 50±2° C. The clearance between rolls was adjusted to 0.5 mm. The batch is put around the fast roll, and the batch is cut ¾ of the distance across the roll from alternate ends of the roll one time each. The time allowed to this step is 1.0 min.

Thereupon, 0.01 mole of dicumyl peroxide is added and successive ¾ cuts are made from alternate ends of the roll, three times each. "Cutting the batch ¾" means that the batch is cut ¾ of the distance across the roll with a knife being held at this position until the bank just disappears. This operation is performed from alternate ends of the roll, allowing 30 seconds between each cut The time allowed for said series of cuttings is 13.0 min. Subsequently, the batch is removed from the rolls, and with the clearance of rolls adjusted to 0.5 mm, the batch was passed through the mill six times, folding it back on itself each time.

TABLE 1

| Example; Kind of Polyene | Kind of Catalyst | Al/V | Composition or Organo-aluminum | Polymerization Temperature (° C.) | Polymerization Pressure (kgf/cm$^2$) | Catalyst Feed Rate (mM/h) | Polyene Feed Rate (g/h) | Kind of α-Olefin |
|---|---|---|---|---|---|---|---|---|
| Example 1 VNB | A | 6 | 7/2 | 40 | 6.8 | 48 | 480 | Propylene |
| Comparative Example | | | | | | | | |
| 1. DCPN | A | 6 | 7/2 | 45 | 6.3 | 75 | 480 | Propylene |
| 2. ENB | A | 6 | 5/1 | 45 | 6.5 | 65 | 350 | Propylene |
| 3. 1,4HD | B | | — | | | | | Propylene |

※"Kind of polyene":
VNB; 5-vinyl-2-norbornene
DCPD; Dicyclopendadiene
ENB; 5-ethylidene-2-norbornene
1,4HD; 1,4-hexadiene
※"Kind of Catalyst"
A; $VOCl_3$—$(Et)_2AlCl/(Et)_{1.5}AlCl_{1.5}$
B; $VO(OEt)Cl_2$—$(Et)_{1.5}AlCl_{1.5}$
※"Composition of Organoaluminum" is denoted by the mole ratio of $(Et)_2AlCl/(Et)_{1.5}AlCl_{1.5}$

| Example; Kind of Polyene | Monomer Feed Rate (kg/h) | Hydrogen Feed Rate (NL/h) | Yield (kg/h) | Ethylene Content (mole %) | Intrinsic Viscosity (dl/g) | Iodine Value (g/100 g) | $\gamma_1/\gamma_1$ | Effective Network Chain Density (v) | Log $(\gamma_2/\gamma_1)/v$ ($\times 10^{10}$) | Mw/Mn |
|---|---|---|---|---|---|---|---|---|---|---|
| Example 1 VNB | 3.7/8.0 | 50 | 4.5 | 75 | 1.90 | 11.5 | 145.1 | 31.8 | 0.068 | 28 |
| Comparative Example | | | | | | | | | | |
| 1. DCPD | 3.2/9.3 | 12 | 4.5 | 66 | 1.85 | 12 | 54.6 | 14.0 | 0.124 | 7.0 |
| 2. ENB | 3.2/9.5 | 7 | 4.5 | 66 | 1.98 | 13 | 27.7 | 14.2 | 0.102 | 6.1 |
| 3. 1,4HD | | | | | | | | | | |

※"Monomer Feed Rate" is indicated by the ethylene/α-olefin ratio.
※"Effective Network Chain Density" is indicated by ($\times 10^{19}$ pcs./cm$^3$).

The time allowed for said operation is 2.0 min. The batch is weighed and the weight change must be within ±1% of the total weight of the batch.

After the thickness of the batch has been adjusted to a thickness of about 2.2 mm, the batch is taken out as an unvulcanized sheet, which is subsequently press cured for 10 min. with a temperature of 170° C., using a 100-ton compression press.

Manufacture of Terpolymer

The ethylene-α-olefin-polyene amorphous copolymer used in below-mentioned Examples and Comparative Examples was prepared by the following method.

Terpolymerization reaction was carried out continuously, using a stainless steel polymerization reactor equipped with agitation impellers (the impeller speed: 250 rpm) having a net internal volume of 100 liters. Hexane, ethylene, propylene, polyene, hydrogen, and catalyst were continuously fed into the liquid phase in the polymerization reactor through its side at the corresponding feed ratios described in Table 1. The hexane feed rate was 60 liters per hr. Principal polymerization conditions are summarized in Table 1, although the polymerization time conformed with the average residence time as mentioned hereinbefore in the paragraph entitled [A process of manufacturing copolymer (B)].

As the result, ethylene-α-olefin-polyene amorphous copolymer was obtained as a homogeneous solution, which was continuously extracted from the bottom portion of the polymerization reactor while a small amount of methanol was added to the polymer solution to terminate the terpolymerization reaction. Subsequently, the polymer was separated from the solvent by steam stripping. The obtained terpolymer was dried by vacuum drying, which was carried out for 48 hrs. at a temperature of 55° C.

The obtained terpolymer was evaluated for its physical properties, according to the above-mentioned testing method. The test results thus obtained are presented in Table 1.

Examples 1–3

Compound (A) was obtained by adding 1.0 part by weight of an organic peroxide (dicumyl peroxide, manufactured by Mitsui Chemical Co, Ltd., Tokyo, Japan; trade name: Mitsui DCP-40C) to 100 parts by weight of silicone rubber (vinyl group content: 0.1 mole %; weight average molecular weight: 440×10$^{3}$, trade name: Silicone Rubber SH871 U) and kneading the ingredients on 8-inch open rolls for 10 min. at a temperature of 40–50° C.

On the other hand, 1.0 part by weight of an organic peroxide (dicumyl peroxide, manufactured by Mitsui Chemical Co., Ltd.; trade name: Mitsui DCP-40C) and 30.0 parts by weight of silica (dry silica, manufactured by Wacker Chemie GmbH, Germany; trade name: N2OP) were added to 100 parts by weight of ethylene-propylene-5-vinyl-2-norborne (VNB) copolymer rubber, and said ingredients were mixed and kneaded on 8-inch open rolls for 20 min. at a temperature of 40–50° C. to obtain Compound (B). Said copolymer rubber had an ethylene/propylene mole ratio of 75/25 and an iodine value of 11.5. The intrinsic viscosity in a decalin solution maintained at a temperature of 135° C. was 1.90 (dl/g).

Next, Compound (A) and Compound (B) were mixed at the weight ratios mentioned in Table 2, and was once again kneaded on 8-inch open rolls in accordance with SRIS.

TABLE 2

|  | Example 1 | Example 2 | Example 3 |
|---|---|---|---|
| Compound (A) | 90 | 50 | 10 |
| Compound (B) | 10 | 50 | 90 |

Successively, the kneaded rubber compound was press cured for 10 min. with a temperature of 170° C. to obtain a vulcanizate sheet of 2 mm in thickness. Tensile tests were conducted in accordance with JIS K6251 to determine the tensile strength at break ($T_B$), elongation at break ($E_B$), and stress value at 100% deformation ($M_{100}$).

Said sheet was tested for its boiling water resistance in accordance with JIS K6258, with the test specimen immersed in boiling water for 48 hrs. Measurements were taken of volume change rate ΔV(%). Furthermore, the specimen was tested for its thermal aging resistance in accordance with JIS K6257. The selected thermal aging conditions were a temperature of 160° C. and an immersion time of 72 hrs. The tensile strength and elongation at break of the specimen after the thermal resistance test were determined and the extent of changes from the values determined prior to the thermal aging test were adopted as indices of thermal aging resistance. Moreover, press cure was carried out a multiple of times under same conditions to determine the time up to the occurrence of mold fouling, and the mold fouling characteristic was evaluated on the basis of this test result.

The results of said physical properties tests are presented in Table 3.

Comparative Example 1

A test was conducted in the same procedure as followed in Example 1, except that the Compound (A) used in Example 1 was used alone as it is for the test. The test result is shown in Table 3.

Comparative Example 2

A test was conducted in the same procedure as followed in Example 1, except that the Compound (B) used in Example 1 was used alone. The test result is shown in Table 3.

Comparative Examples 3–5

Tests were conducted in the same procedure as followed in Example 1, except that the ethylene-propylene-5-dicyclopentadiene (DCPD) copolymer rubber (Compound B2) described in Table 1 was used in place of ethylene-propylene-5-vinyl-2-norbornene copolymer rubber used in Examples 1–3. The test results are shown in Table 3.

Comparative Examples 6–8

Test were conducted in the same procedure as followed in Example 1, except that the ethylene-propylene-5-ethylidene-2-norbornene (ENB) copolymer rubber (Compound B3) described in Table 1 was used in place of ethylene-propylene-5-vinyl-2-norbornene copolymer rubber used in Examples 1–3. The test results are shown in Table 3.

Comparative Examples 9–11

Test were conducted in the same procedure as followed in Example 1, except that the ethylene-propylene-1,4-hexadiene copolymer rubber (Compound B4) described in Table 1 was used in place of ethylene-propylene-5-vinyl-2-norbornene copolymer rubber used in Examples 1–3. The test results are shown in Table 3.

It is further understood by those skilled in the art that the foregoing description is a preferred embodiment of the disdosed composition and that various changes and modifications may be made in the invention without departing from the spirit and scope thereof.

TABLE 3

|  | Example 1 | Example 2 | Example 3 | Comparative Example 1 | Comparative Example 2 | Comparative Example 3 | Comparative Example 4 |
|---|---|---|---|---|---|---|---|
| Components |  |  |  |  |  |  |  |
| A | 90 | 50 | 10 | 100 |  | 90 | 50 |
| B | 10 | 50 | 90 |  | 100 |  |  |
| B2 |  |  |  |  |  | 10 | 50 |
| B3 |  |  |  |  |  |  |  |
| B4 |  |  |  |  |  |  |  |
| Physical Properties |  |  |  |  |  |  |  |
| $M_{100}$ (MPa) | 3.1 | 2.1 | 1.6 | 3.4 | 1.5 | 2.8 | 1.7 |
| $T_B$ (MPa) | 5.6 | 7.2 | 10.9 | 5.9 | 11.2 | 5.5 | 3.9 |
| $E_B$ (%) | 290 | 410 | 560 | 280 | 600 | 370 | 480 |
| Boiling Water Resistance ΔV (%) | 1.1 | 0.7 | 0.3 | 1.2 | 0.2 | 1.1 | 0.8 |
| Thermal Aging Resistance |  |  |  |  |  |  |  |

TABLE 3-continued

| | | | | | | | |
|---|---|---|---|---|---|---|---|
| AH | +14 | +27 | +26 | +5 | +28 | +18 | +27 |
| $A_R(T_B)$ (%) | 120 | 85 | 50 | 115 | 20 | 118 | 136 |
| $A_R(E_B)$ (%) | 53 | 5 | 3 | 75 | 1 | 45 | 4 |
| Mold Fouling | 315 | 245 | 155 | 415 | 80 | 210 | 150 |

| | Comparative Example 5 | Comparative Example 6 | Comparative Example 7 | Comparative Example 8 | Comparative Example 9 | Comparative Example 10 | Comparative Example 11 |
|---|---|---|---|---|---|---|---|
| Components | | | | | | | |
| A | 10 | 90 | 50 | 10 | 90 | 50 | 10 |
| B | | | | | | | |
| B2 | 90 | | | | | | |
| B3 | | 10 | 50 | 90 | | | |
| B4 | | | | | 10 | 50 | 90 |
| Physical Properties | | | | | | | |
| $M_{100}$ (MPa) | 1.1 | 2.7 | 1.6 | 1.0 | 2.5 | 1.4 | 1.0 |
| $T_B$ (MPa) | 2.5 | 5.3 | 3.5 | 2.4 | 5.2 | 3.1 | 2.1 |
| $E_B$ (%) | 700 | 390 | 510 | 720 | 410 | 580 | 790 |
| Boiling Water Resistance $\Delta V$ (%) | 0.4 | 1.1 | 0.8 | 0.4 | 1.1 | 0.9 | 0.5 |
| Thermal Aging Resistance | | | | | | | |
| AH | +26 | +18 | +27 | +28 | +18 | +25 | +24 |
| $A_R(T_B)$ (%) | 127 | 120 | 140 | 115 | 145 | 140 | 135 |
| $A_R(E_B)$ (%) | 1 | 43 | 4 | 1 | 53 | 5 | 3 |
| Mold Fouling | 95 | 195 | 135 | 85 | 200 | 140 | 85 |

※"A", "B", "B2", "B3", and "B4" in "Components" indicate generic names of the compounds, i.e., "B": VNB—EPT "B2": DCPD—EPT "B3": ENB—EPT "B4": 1,4HD—EPT
※"Physical Properties" indicate physical properties of vulcanizate, i.e., "$M_{100}$": Tensile stress at 100% deformation (MPa), "$T_B$": Tensile strength (MPa); and "$E_B$": Elongation at break (%)
※"Thermal Aging Resistance" is indicated by the ratio of changes in the tensile strength and elongation at break after 72 hr.-exposure to heat in an oven maintained at 160° C. "AH": Hardness "$A_R(T_B)$": Tensile strength retention ratio "$A_R(E_B)$": Elongation retention ratio
※"Mold Fouling" is indicated by the cycle of press forming up to the occurence of mold fouling.

What we claim is:

1. A curable rubber composition comprising 2–98% by weight of a silicone rubber (A) and 98–2% by weight of an ethylene-α-olefin-polyene amorphous copolymer (B), wherein said polyene is a norbornene compound represented by formula [I] or [II], which contains at least one kind of vinyl terminal group

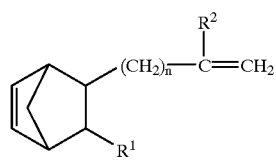

[I]

wherein n is an integer of 0 to 10,
R$^1$ is a hydrogen atom or an alkyl group having 1 to 10 carbon atoms,
R$^2$ is a hydrogen atom or an alkyl group having 1 to 5 carbon atoms,

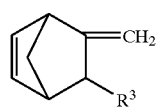

[II]

wherein R$^3$ is a hydrogen atom or an alkyl group having 1 to 10 carbon atoms.

2. A curable rubber composition according to claim 1, wherein the silicone rubber (A) is a silicone having a vinyl group.

3. A curable rubber composition according to claim 2, wherein the silicone rubber(A) contains 0.02–2.0 mole % of vinyl group.

4. A curable rubber composition according to claim 1, wherein the ethylene-α-olefin-polyene amorphous copolymer (B) is such that (1) its α-olefin has 3–20 carbon atoms,
(2) its ethylene to α-olefin ratio is 40/60–95/5 (mole ratio),
(3) its iodine value is 0.5–50,
(4) its intrinsic viscosity in a decalin solution maintained at 135° C. is 0.5–10 (dl/g),
(5) its molecular weight distribution (Mw/Mn) determined by GPC is 3–50.

5. A curable rubber composition according to claim 4, wherein the ethylene-α-olefin-polyene amorphous copolymer (B) is such that (6) its effective network chain density (v) is $1.5 \times 10^{20}$– $100 \times 10^{20}$ (pcs./cm$^3$) when it is press cured for 10 min. at a temperature of 170° C. after 0.01 mole of dicumyl peroxide is added to 100 g of the copolymer,
(7) the relationship between the ratio of the shear rate ($\gamma_2$) at the shear stress of $2.4 \times 10^6$ (dyn/cm$^2$) as obtained from a melt flow curve plotted for a temperature of 100° C. to the shear rate ($\gamma_1$) at the shear stress of $0.4 \times 10^6$ (dyn/cm$^2$), namely, ($\gamma_2/\gamma_1$), on one hand and said effective network chain density (ν) on the other satisfies the following general formula [III]

$$0.04 \times 10^{-19} \leq \log(\gamma_2/\gamma_1)/\nu \leq 0.20 \times 10^{-19} \quad [\text{III}]$$

6. A curable rubber composition according to claim 1, wherein the ethylene-α-olefin-polyene amorphous copolymer (B) is either ethylene-propylene-5-methylene-2-norbornene random copolymer or ethylene-propylene-5-vinyl-2-norbornene random copolymer.

7. A curable rubber composition according to claim 1, wherein $1 \times 10^{-3}$–$5 \times 10^{-2}$ mole of an organic peroxide is added to 100 g of the silicone rubber (A) and the ethylene-α-olefin-polyene amorphous copolymer (B) combined.

8. A curable rubber composition according to claim 7, wherein the organic peroxide has the temperature of 130–200° C. affording a half-life of 1 min.

9. A curable rubber composition according to claim 7, wherein organic peroxide is selected from the group consisting of dicumyl peroxide, di-t-butyl peroxide, di-t-butyl peroxy-3,3,5-trimethylchlorohexane, t-butyl cumyl peroxide, di-t-amyl peroxide, t-butyl hydroperoxide, 2,5-dimethyl-2,5di(t-butyl peroxy)hexyne-3,2,5-dimethyl-2,5-di(benzoyl peroxy)hexane, and 1,1-bis-t-butyl peroxy-3,3,5-trimethyl cyclohexane.

* * * * *